United States Patent [19]

Blatt

[11] Patent Number: 5,181,599
[45] Date of Patent: Jan. 26, 1993

[54] DUAL-BELT SHUTTLE UNIT

[76] Inventor: John A. Blatt, 22 Stratton Pl., Grosse Pointe Shores, Mich. 48236

[21] Appl. No.: 636,628

[22] Filed: Jan. 2, 1991

[51] Int. Cl.⁵ .............................................. B65G 15/58
[52] U.S. Cl. .............................. 198/468.6; 198/468.2; 414/751
[58] Field of Search ................ 198/583, 468.2, 468.01, 198/468.6; 414/749, 751

[56] References Cited

U.S. PATENT DOCUMENTS

| | | | |
|---|---|---|---|
| 3,546,956 | 12/1970 | Blatt | 74/394 |
| 3,665,771 | 5/1972 | Blatt | 74/29 |
| 3,966,058 | 6/1976 | Heffron et al. | 198/468.2 X |
| 4,182,442 | 1/1980 | Jones | 198/468.2 X |
| 4,361,413 | 11/1982 | Toda | 198/468.6 X |
| 4,372,538 | 2/1983 | Balfanz | 414/751 X |
| 4,386,693 | 6/1983 | Bachman | 198/468.2 X |
| 4,444,540 | 4/1984 | Blatt | 414/589 |
| 4,475,863 | 10/1984 | Blatt | 414/589 |
| 4,543,034 | 9/1985 | Blatt | 414/752 |
| 4,553,444 | 11/1985 | Blatt | 74/110 |
| 4,688,668 | 8/1987 | Ookubo et al. | 198/468.6 X |
| 4,988,261 | 1/1991 | Blatt | 414/749 |
| 4,995,505 | 2/1991 | Takahashi et al. | 198/468.01 X |
| 5,002,448 | 3/1991 | Kamijima et al. | 414/751 X |

FOREIGN PATENT DOCUMENTS 3241006  5/1984  Fed. Rep. of Germany ... 198/468.2

Primary Examiner—Joseph E. Valenza
Assistant Examiner—James R. Bidwell
Attorney, Agent, or Firm—Basile and Hanlon

[57] ABSTRACT

A dual-belt shuttle unit for transporting an article lifting device between work stations inlcudes a fixed frame assembly for supporting the overhead transfer system. A bracket assembly, supported by the fixed frame, extends along a horizontal plane betweeen two work stations. The bracket has two guide rails extending the length of the assembly for guiding a multiplicity of carriage assemblies in a horizontal plane relative to the bracket assembly. A conveyor system drives the carriage assemblies. The drive unit for the conveyor system is demountable and replaceable when required to transfer heavier workloads. The dual-belt shuttle unit is self-supporting and can be attached in series to several other dual-belt shuttle units to create a complete assembly line.

10 Claims, 5 Drawing Sheets

DUAL-BELT SHUTTLE UNIT

BACKGROUND OF THE INVENTION

1. Field of the Invention

The present invention is directed to a dual-belt shuttle unit, more specifically, a horizontal dual-belt shuttle unit extending in a horizontal plane in a production line setting. The dual-belt shuttle unit typically transfers an article lifting device in a horizontal path from a first work station to a second work station.

2. Description of the Prior Art

Dual-belt shuttle units of the general type with which the present invention is concerned typically include a fixed frame extending between a first and second work station and a single carriage dual-belt shuttle unit for transporting an article lifting device between the work stations. A drive unit is permanently mounted to the fixed frame and drives the conveyor system which transfers the article lifting device in a horizontal plane on the carriage dual-belt shuttle unit.

A disadvantage of this previous system is that it requires a separate fixed frame and carriage dual-belt shuttle unit, along with a continuous support frame structure spanning several work stations. Further, each drive unit is permanently disposed on the fixed frame member thereby eliminating any possibility of exchanging a heavy duty drive unit for a lightweight drive unit when lifting and transporting different sized workpieces.

The present invention is directed to a dual-belt shuttle unit for horizontally transferring an article lifting device able to support multiple carriage dual-belt shuttle units for transferring the article lifting device between multiple work stations. The fixed frame member of the dual-belt shuttle unit is extendable along a horizontal plane between each work station. If necessary, the frame members may be attached in series along the work path to create a single assembly line as necessary. Each unit is self-supporting and, therefore, easily replaceable. Furthermore, each unit contains its own separate drive unit which itself is demountable and readily replaceable.

SUMMARY OF THE INVENTION

A dual-belt shuttle unit embodying the present invention includes a fixed frame assembly for supporting the overhead transfer system. A bracket assembly, supported by the fixed frame, extends along a horizontal plane between two work stations. The bracket assembly has two guide rails extending the length of the assembly and spanning the width of the bracket.

A carriage assembly is provided for transporting an article lifting device along the bracket assembly between work stations. The carriage assembly includes a plurality of rollers provided at opposite ends of the carriage assembly. The rollers engage the rails provided on the bracket assembly to guide the carriage assembly in horizontal movement relative to the bracket assembly.

A conveyor system is supported between the bracket assembly and the carriage assembly to transport the carriage assembly along the horizontal path. The conveyor system comprises a drive gear and an idler roll defining the outer limits of the horizontal plane and a conveyor belt extending around and meshing with the gears. The conveyor belt is permanently attached to the carriage assembly by an L-shaped bracket connected to the interior of the carriage assembly.

A separate drive unit is provided for each shuttle assembly. The drive unit is demountable from the bracket assembly. This enables an operator to change the drive unit to correspond with an increase in the power needed to transfer different workpieces between the work stations. Therefore, as the workpiece to be transported increases in size or weight between work stations, the proper drive unit may be mounted on each dual-belt shuttle unit to accommodate this increase.

Each dual-belt shuttle unit may accommodate a plurality of carriage assemblies where needed. Each carriage assembly is provided with its own separate drive unit. The corresponding conveyor systems for transporting the carriage assemblies lie parallel to other conveyor systems within the bracket assembly. In this way, each dual-belt shuttle unit and each carriage assembly is self-enclosed, thereby enabling a multiplicity of changes as required along the transfer system.

Finally, each dual-belt shuttle unit may be attached to a subsequent dual-belt shuttle unit in series to create a complete transfer system. Each self-enclosed dual-belt shuttle unit may be moved to any position within the assembly plant to accommodate any changes in the layout of the assembly work stations.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawings, in which like reference characters refer to like parts throughout the views, and in which.

DETAILED DESCRIPTION OF THE PREFERRED EMBODIMENT

Figure 1A:
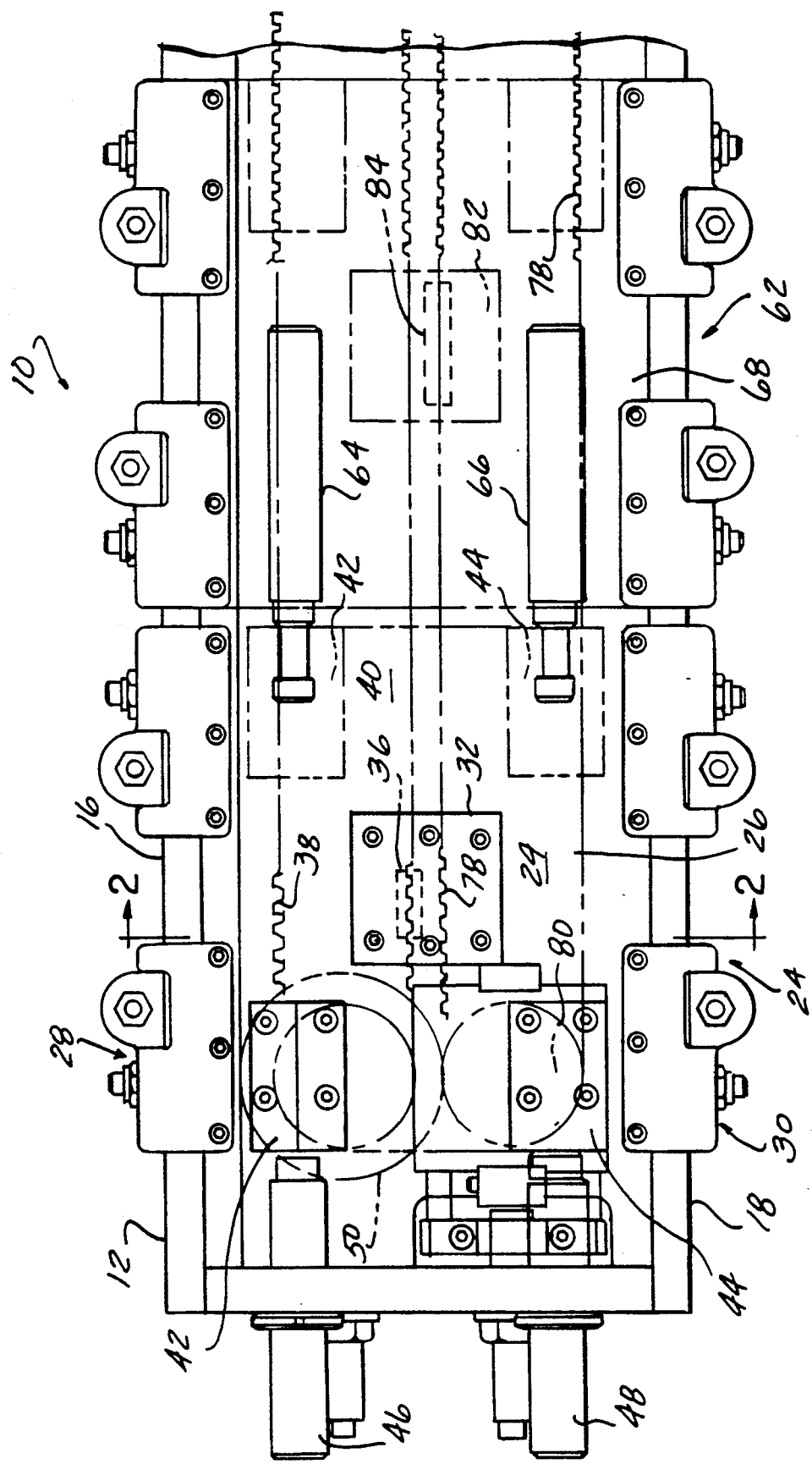
FIG. 1A is a front elevational view of the left end of a dual-belt shuttle unit in accordance with the present invention.
Figure 1B:
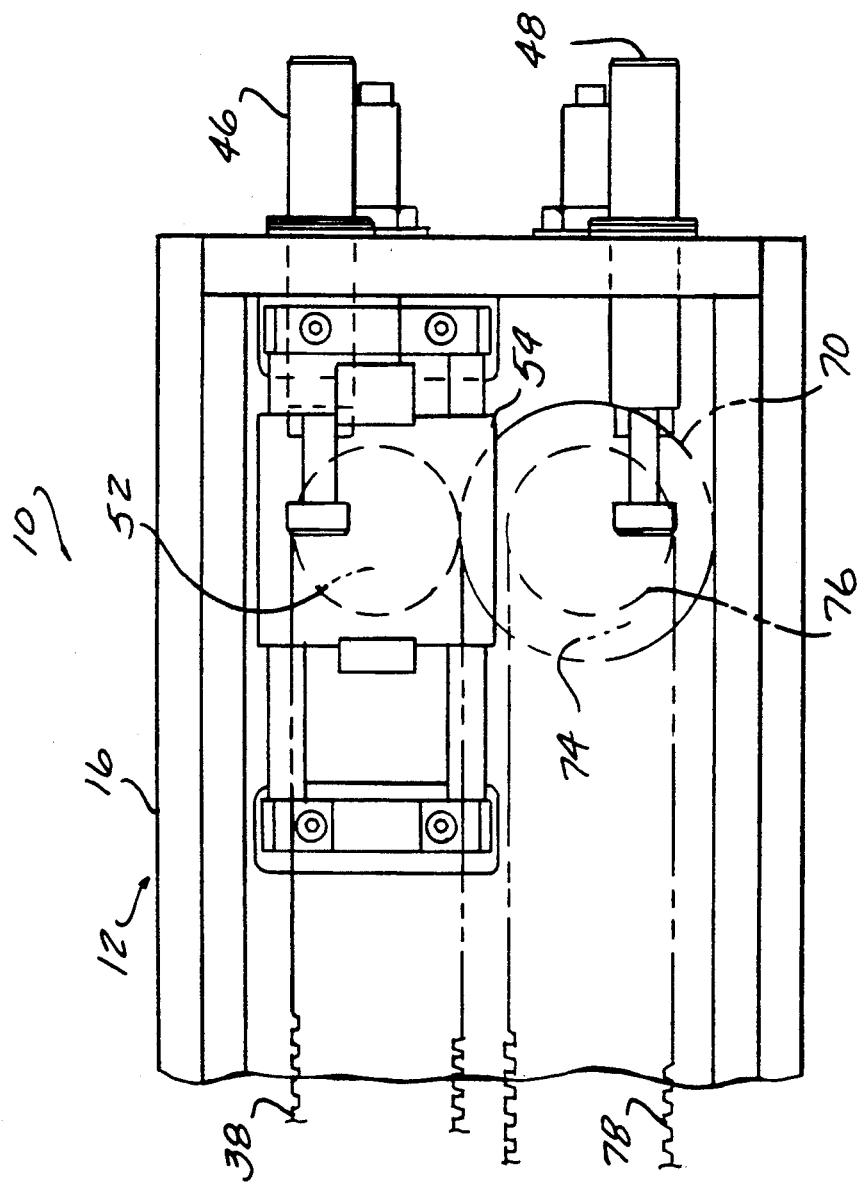
FIG. 1B is a front elevational view of the right end of the dual belt shuttle unit.
Figure 2:
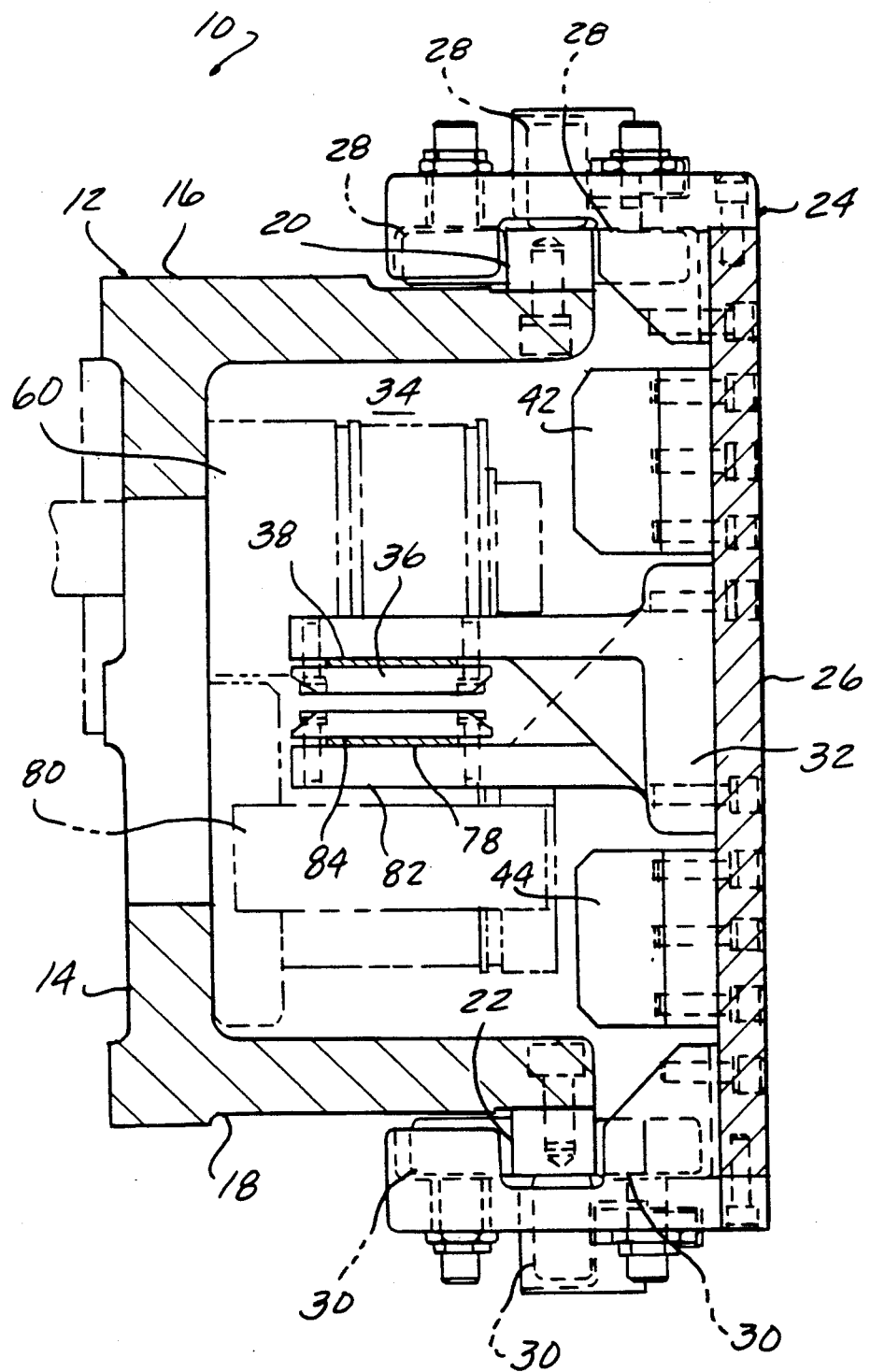
FIG. 2 is a fragmentary cross sectional view taken along line 2—2 of FIG. 1A.
Figure 4:
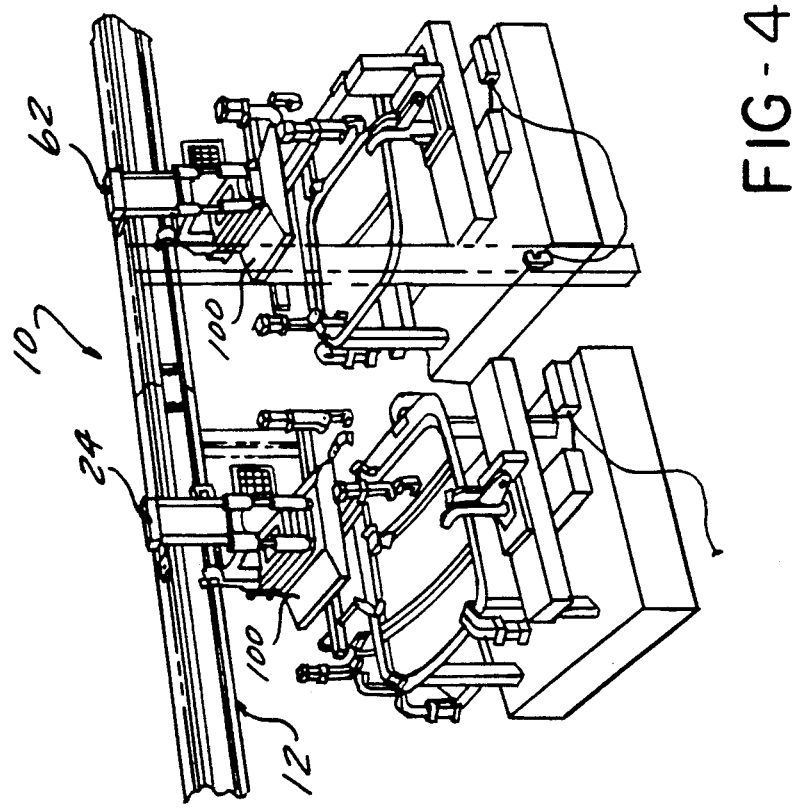
FIG. 4 is a perspective view of a dual-belt shuttle unit in use in accordance with the present invention.

Referring to FIGS. 1A and 1B and 4, a dual-belt shuttle unit 10 includes a bracket assembly 12 extending in a horizontal plane. The bracket assembly 12 is substantially C-shaped as best seen in FIG. 2. The bracket assembly 12 consists of an elongate vertical member 14 and opposing integral horizontal members 16, 18 extending transversely from each end of the vertical member 14.

Guide rails 20, 22 extend outwardly from each opposing horizontal member 16, 18. The guide rails 20, 22 extend parallel to the vertical member 14 the entire length of the bracket assembly 12.

A carriage assembly, designated generally at 24, is provided for transporting a lift unit 100 (FIG. 4) in the horizontal plane along the bracket assembly 12. A carriage plate 26 spans the width of the bracket assembly 12. Roller assemblies 28, 30 are provided at opposite ends of the carriage plate 26 and engage the guide rails 20, 22 to guide the carriage assembly 24 in horizontal movement relative to the bracket assembly 12.

With reference now to FIG. 2, an L-shaped bracket 32 is secured to the interior of the carriage plate 26 and extends between the open area 34 provided between the carriage assembly 24 and the bracket assembly 12. A plate 36 secures a drive belt 38 of the conveyor assembly 40 to the carriage assembly 24.

As can best be seen in FIGS. 1A and 2, bearing blocks 42, 44 are located adjacent the L-shaped bracket 32 at approximately each corner of the carriage plate 26. Shock absorbers 46, 48 are attached to each corner of the bracket assembly 12. The placement of the bearing blocks 42, 44 on the carriage plate 26 correlates with the placement of the shock absorbers 46, 48 on the bracket assembly 12.

The conveyor assembly 40 is supported substantially by the bracket assembly 12. The conveyor assembly 40 includes the drive belt 38 rotated about two opposing sprockets or end gears 50, 52, where end gear 50 (FIG. 1A) is a driving gear and end gear 52 (FIG. 1B) is an idler roll. Gears 50, 52 are fixedly attached to opposite ends of the bracket assembly 12 while drive belt 38 rotates about end gears 50, 52. A take-up assembly 54 (FIG. 1B) is provided with end gear 52 at one end of the bracket assembly 12.

Figure 3:
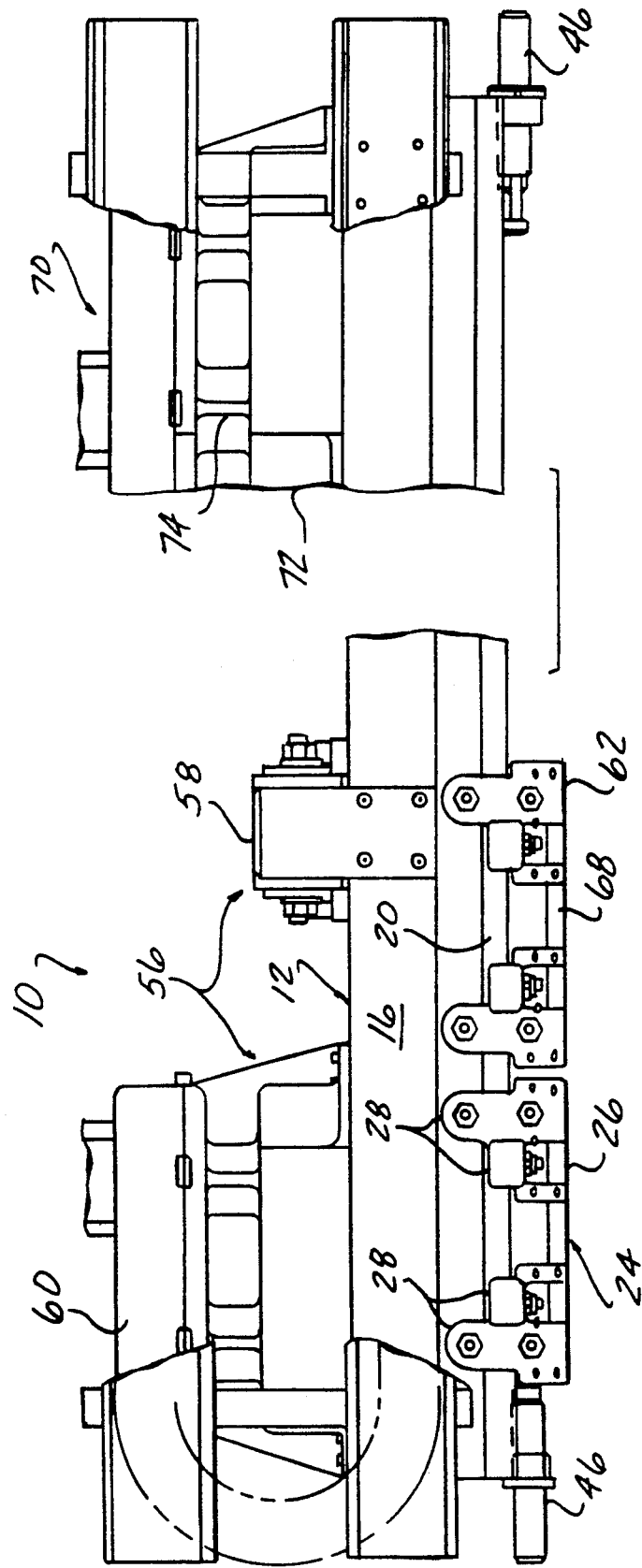
FIG. 3 is a combined top view of FIGS. 1A and 1B.

Referring to FIG. 3, a drive unit 56 is mounted to the bracket assembly 12 parallel to the drive gear 50. Drive 56 includes a reversible electric motor 58 which is drivingly coupled to a transmission unit 60 (FIGS. 2 and 3) mounted adjacent to the electric motor 58 on the bracket assembly 12. Drive gear 50 is driven by transmission unit 60.

With reference now to FIG. 1A, a second carriage assembly 62 may be provided on the dual-belt shuttle unit 10, if necessary. This second carriage assembly 62 is substantially identical to carriage assembly 24 and includes shock absorbers 64, 66 attached to second carriage plate 68. The shock absorbers 64, 66 are located on the second carriage plate 68 parallel with bearing blocks 42, 44 on carriage plate 26.

A second drive unit 70 (FIGS. 1B and 3) for driving the second carriage assembly 62 is located opposite drive unit 56 on the bracket assembly 12. Second drive unit 70 includes a reversible electric motor 72 which is drivingly coupled to a transmission unit 74. Transmission unit 74 drives drive gear 76 and rotates drive belt 78 about end gear 80 (FIG. 1A) and drive gear 76. Drive belt 78 is located parallel to drive belt 38 in the bracket assembly 12. Drive belt 78 is secured to the second carriage plate 68 by L-shaped bracket 82 and plate 84.

In use, the dual-belt shuttle unit 10 is arranged in a fixed frame structure (FIG. 4) between work stations for transferring a workpiece. Bracket assembly 12 spans the area between the two work stations. Carriage assemblies 24, 62 are driven by drive units 56, 70, respectively, to transfer an article lifting devices 100 from a first work station to a second work station. Shock absorbers 46, 48 prevent each carriage assembly 24, 62 from overriding the span of the bracket assembly 12. Shock absorbers 64, 66 prevent carriage assemblies 24, 62 from colliding into each other.

An advantage of the dual-belt shuttle unit 10 is that each drive unit 56, 70 is demountable from the bracket assembly 12 and, therefore, replaceable with whatever drive unit is required for movement of individual workpieces. A further advantage of the dual-belt shuttle unit 10 is that a plurality of carriage assemblies may be supported in parallel within the bracket assembly 12. A still further advantage of the dual-belt shuttle unit is that each unit is self-supporting. Several dual-belt shuttle units may be connected in series by detachably connecting means such as bolts or rivets to produce a complete assembly line between a series of work stations. If the layout of the assembly line needs to be changed due to a manufacturing processing change, the dual-belt shuttle units can be easily removed and replaced in accordance with the new layout plan.

Having described my invention, however, many modifications thereto will become apparent to those skilled in the art to which it pertains without deviation from the spirit of the invention as defined by the scope of the appended claims.

I claim:

1. A power-driven shuttle comprising:
   a single elongated bracket having first and second ends, said bracket substantially C-shaped and having an elongate vertical member and opposing horizontal members extending transversely from each end of said vertical member, and each of said horizontal members having a rail fixedly attached to an outer surface of said horizontal members, extending parallel to said vertical member;
   at least one carriage means for transporting a lift unit in a horizontal plane along said bracket, said carriage means further including a carriage plate slidably received about said bracket, a plurality of rollers at opposing ends of said plate engaging said rails to guide said carriage means in horizontal movement relative to said bracket, at least one L-shaped bracket fixedly secured to an interior surface of said carriage plate, and at least one bearing block fixedly secured to said interior surface of said carriage plate;
   at least one conveyor means for transporting said carriage means in said horizontal plane; and
   means for connecting said carriage means in series with a plurality of said carriage means on said single bracket.

2. The power-driven shuttle of claim 1, said conveyor means further comprising a drive and take-up unit disposed between said bracket and said carriage means and having a drive belt extending from a drive gear at one end of said bracket to an idler roller disposed at an opposite end of said bracket, said drive belt fixedly attached to said carriage plate by said L-shaped bracket for reciprocating said carriage plate in movement relative to said bracket.

3. The power-driven shuttle of claim 2 wherein said drive unit is demountable from said conveyor means.

4. The power-driven shuttle of claim 3 further comprising a shock absorbing means fixedly attached to said bracket parallel with said carriage means for impacting with said bearing block.

5. A power-driven shuttle comprising:
   a single elongated bracket having first and second ends, said bracket substantially C-shaped and having an elongate vertical member and opposing horizontal members extending transversely from each end of said vertical member, and each of said horizontal members having a rail fixedly attached to an outer surface of said horizontal members extending parallel to said vertical member;

at least one carriage means for transporting a lift unit in a horizontal plane along said bracket, said carriage means including a carriage plate movable with respect to said bracket, a plurality of rollers at opposing ends of said plate engaging said rails to guide said carriage means in horizontal movement relative to said bracket, at least one L-shaped bracket fixedly secured to an interior surface of said carriage plate, and at least one bearing block fixedly secured to said interior of said carriage plate;

at least one conveyor means for transporting said carriage means in said horizontal plane, said conveyor means including a drive and take-up unit disposed between said bracket and said carriage means and having a drive belt extending from a drive gear at one end of said bracket to an idler roller disposed at the opposite end of said bracket, said drive belt fixedly attached to said carriage plate by said L-shaped bracket for reciprocating said carriage plate in movement relative to said bracket, said drive unit demountable from said conveyor;

means for connecting said carriage means in series with a plurality of said carriage means on said single bracket; and a shock absorbing means fixedly attached to said bracket parallel with said carriage means for impacting with said bearing block.

6. The power-driven shuttle of claim 5, further comprising:

second carriage means for transporting a second lift unit in a horizontal plane along said single elongated bracket; and second conveyor means for transporting said second carriage means in said horizontal plane.

7. The power-driven shuttle of claim 6, wherein said second carriage means further comprises:

a second carriage plate slidably received about said single elongated bracket;

a plurality of rollers at opposing ends of said second carriage plate engaging said rails to guide said second carriage means in horizontal movement relative to said single elongated bracket;

at least one L-shaped bracket fixedly secured to an interior surface of said second carriage plate; and at least one bearing block fixedly secured to said interior surface of said second carriage plate.

8. The power-driven shuttle of claim 6, wherein said conveyor means further comprises:

a second drive and take-up unit disposed between said single elongated bracket and said second carriage means and having a second drive belt extending from a second drive gear at one end of said single elongated bracket to a second idler roller disposed at an opposite end of said single elongated bracket, said single drive belt fixedly attached to said second carriage plate by said second L-shaped bracket for reciprocating said second carriage plate in movement relative to said single elongated bracket.

9. The power-driven shuttle of claim 8, wherein said second drive unit is demountable from said second conveyor means.

10. The power-driven shuttle of claim 5, further comprising:

a second shock absorbing means fixedly attached to said single elongated bracket parallel with said second carriage means for impacting with said bearing block carried by said second carriage means.

* * * * *